(12) United States Patent
Lee

(10) Patent No.: US 9,491,402 B2
(45) Date of Patent: Nov. 8, 2016

(54) ELECTRONIC DEVICE AND METHOD OF PROCESSING IMAGE IN ELECTRONIC DEVICE

(71) Applicant: Samsung Electronics Co., Ltd, Gyeonggi-do (KR)

(72) Inventor: Jun-Taek Lee, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/736,065

(22) Filed: Jun. 10, 2015

(65) Prior Publication Data
US 2015/0358578 A1 Dec. 10, 2015

(30) Foreign Application Priority Data
Jun. 10, 2014 (KR) .......................... 10-2014-0070132

(51) Int. Cl.
*H04N 7/14* (2006.01)

(52) U.S. Cl.
CPC ..................................... *H04N 7/141* (2013.01)

(58) Field of Classification Search
CPC .......... H04N 7/147; H04N 7/14; H04N 7/15; H04N 7/157
USPC ........................................... 348/14.01–14.16
See application file for complete search history.

(56) References Cited

U.S. PATENT DOCUMENTS

| | | | |
|---|---|---|---|
| 2004/0227810 A1* | 11/2004 | Hamada | H04N 7/147 348/14.02 |
| 2005/0259740 A1 | 11/2005 | Kobayashi et al. | |
| 2007/0115350 A1* | 5/2007 | Currivan | H04N 7/147 348/14.08 |
| 2009/0060286 A1 | 3/2009 | Wheeler et al. | |
| 2010/0141783 A1 | 6/2010 | Sakaguchi et al. | |
| 2010/0188476 A1* | 7/2010 | Thapa | H04N 7/15 348/14.08 |
| 2011/0169969 A1 | 7/2011 | Matsuda et al. | |
| 2012/0236105 A1* | 9/2012 | Alberth | G06T 19/006 348/14.07 |
| 2013/0143544 A1* | 6/2013 | Noda | H04W 4/001 455/418 |
| 2014/0267396 A1* | 9/2014 | Doolittle | G06T 19/006 345/633 |
| 2014/0267583 A1* | 9/2014 | Zhu | H04N 19/21 348/14.13 |

* cited by examiner

Primary Examiner — Melur Ramakrishnaiah

(57) ABSTRACT

A device and a method for processing an image in an electronic device are disclosed. According to various embodiments, a method of processing an image in an electronic device may include: receiving, by the electronic device, at least one first image from an external device; determining, by the electronic device, whether the electronic device revises at least a part of the at least one first image based on at least a portion of a quality of the at least one first image; changing, by the electronic device, the part by using at least a portion of a second image; and displaying, by the electronic device, a third image including the changed part. In addition, other embodiments may be possible in the various embodiments of the present disclosure.

18 Claims, 9 Drawing Sheets

ELECTRONIC DEVICE AND METHOD OF PROCESSING IMAGE IN ELECTRONIC DEVICE

CROSS-REFERENCE TO RELATED APPLICATION(S) AND CLAIM OF PRIORITY

The present application is related to and claims the priority under 35 U.S.C. §119(a) to Korean Application Serial No. 10-2014-0070132, which was filed in the Korean Intellectual Property Office on Jun. 10, 2014, the entire content of which is hereby incorporated by reference.

TECHNICAL FIELD

Various embodiments of the present disclosure relate to an electronic device and a method of processing an image in the electronic device.

BACKGROUND

By virtue of a development of a wireless communication technology, a wireless communication speed is rapidly increased, and thus real-time video call services as well as voice call services may be provided.

In addition, various recent electronic devices have been developed to use diverse functions such as a photography function, a music function, a video function, a multimedia function, a game function, and the like as well as a wireless communication function. A display unit is provided on a front surface of the electronic devices for effective usage of the diverse functions.

Further, various applications (referred to as 'Apps') may be installed and performed in the electronic device, and a plurality of applications may be simultaneously performed in one electronic device.

SUMMARY

Meanwhile, in order to provide high quality video call services, image data may be compressed to be transmitted. But, the providing of the high quality video call service is limited in a limited bandwidth, with only the image compression technique.

To address the above-discussed deficiencies, in various embodiments of the present disclosure, an electronic device and a method of processing an image in the electronic device capable of providing a high quality video call service by revising a low-definition image into a high-definition image through a reference image may be provided.

A method of processing an image according to an embodiment among various embodiments of the present disclosure may include: receiving at least one first image from an external device, by the electronic device; determining whether the electronic device revises at least a part of the first image, based on at least a portion of a quality of the first image, by the electronic device; changing the part by using at least a portion of a second image, by the electronic device; and displaying a third image including the changed part, by the electronic device, in a method of operating the electronic device.

An electronic device according to an embodiment among various embodiments of the present disclosure may include: at least one processor; a display; a communication module; and a memory device, wherein the memory device is performed by the processor, and the memory device may be configured to store instructions enabling the electronic device to perform receiving at least one first image from an external device through the communication module; determining whether the electronic device revises at least a part of the first image, based on at least a portion of a quality of the first image; changing the part by using at least a portion of a second image; and displaying a third image including the changed part.

According to various embodiments of the present disclosure, when a high quality image may not be transmitted because an electronic device is located in a weak electric field area or a base station where many subscribers are crowded during a video call, an image quality with respect to a face image of the other party may be improved and displayed, and thus high quality video call services may also be provided in a limited communication environment.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
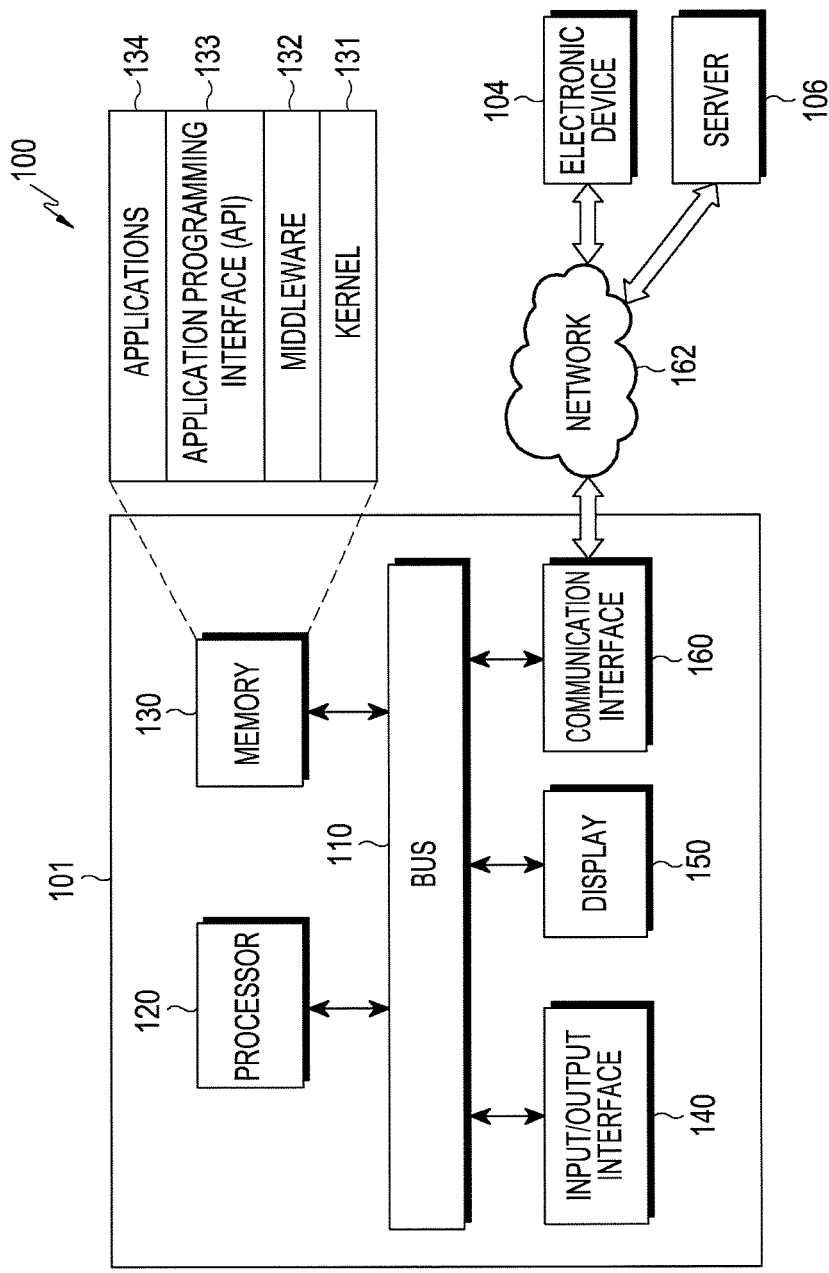
FIG. 1 illustrates a network environment according to an embodiment of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Hereinafter, embodiments of the present disclosure will be described with reference to the accompanying drawings. The present disclosure may have various embodiments, and modifications and changes may be made therein. Therefore, the present disclosure will be described in conjunction with particular embodiments shown in the accompanying drawings. However, it should be understood that there is no intent to limit the present disclosure to the particular forms disclosed, but on the contrary, the present disclosure is to cover all modifications, equivalents, and/or alternatives falling within the spirit and scope of the disclosure. In description of the drawings, similar elements are indicated by similar reference numerals.

In the present disclosure, the expression "include" or "may include" refers to existence of a corresponding function, operation, or element, and does not limit one or more additional functions, operations, or elements. In the present disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In the present disclosure, the expression "or" includes any or all combinations of words enumerated together. For example, the expression "A or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. For example, the above expressions do not limit the sequence and/or importance of the elements. For example, a first user device and a second user device indicate different user devices although both of them are user devices. For example, a first element could be termed a second element, and similarly, a second element could be also termed a first element without departing from the scope of the present disclosure.

In the case where a component is referred to as being "connected" or "accessed" to another component, it should be understood that not only the component is directly connected or accessed to the other component, but also, there may exist another component between them. Meanwhile, in the case where a component is referred to as being "directly connected" or "directly accessed' to other component, it should be understood that there is no component there between.

The terms used in the present disclosure are only used to describe specific embodiments, and are not intended to limit the present disclosure. As used herein, the singular forms are intended to include the plural forms as well, unless the context clearly indicates otherwise.

Unless defined otherwise, all terms used herein, including technical and scientific terms, have the same meanings as commonly understood by those of skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present specification.

An electronic device according to the present disclosure may be, but is not limited to, a device including a communication function. For example, the electronic device may include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, a wearable device (for example, a Head-Mounted-Device (HMD) such as electronic glasses, electronic clothes, an electronic bracelet, an electronic necklace, an electronic appcessory, an electronic tattoo, and a smart watch).

According to some embodiments, the electronic device may be a smart home appliance with a communication function. The smart home appliance as an example of the electronic device may include at least one of, for example, a television, a Digital Video Disk (DVD) player, an audio system, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic picture frame.

According to some embodiments, the electronic device may include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) of a shop.

According to some embodiments, the electronic device may include at least one of a part of furniture or a building/structure having a communication function, an electronic board, an electronic signature receiving device, a projector, and various kinds of measuring instruments (e.g., a water meter, an electric meter, a gas meter, a radio wave meter, and the like). The electronic device according to the present disclosure may be a combination of one or more of the aforementioned various devices. Also, the electronic device according to the present disclosure may be a flexible device. Further, the electronic device according to the present disclosure is not limited to the aforementioned devices.

Hereinafter, the electronic device according to the various embodiments will be described with reference to the accompanying drawings. The term "user" used in the various embodiments may refer to a person or a device using the electronic device.

FIG. 1 illustrates a network environment 100 including an electronic device 101 according to various embodiments of the present disclosure. Referring to FIG. 1, the electronic device may include a bus 110, a processor 120, a memory 130, an input/output interface 140, a display 150, and a communication interface 160. An image process module may be included in the processor 120.

The bus 110 may be a circuit to connect the above-described component elements with each other and to transfer a communication (for example, control messages) among the above-described component elements.

The processor 120 may receive an instruction from the above-described other component elements (e.g., the memory 130, the input/output interface 140, the display 150, the communication interface 160, or the like), for example, through the bus 110, decode the received instruction, and perform a calculation or a data process according to the decoded instruction.

The memory 130 may store the instruction or the data received from the processor 120 or other component elements (e.g., the input/output interface 140, the display 150, the communication interface 160, or the like) or generated from the processor 120 or other component elements. The memory 130 may include programming modules, for example, a kernel 131, a middleware 132, an Application Programming Interface (API) 133, or an application 134. Each of the programming modules described above may be configured by a software, a firmware, a hardware, or combinations of two or more thereof.

The kernel 131 may control or manage system resources (for example, the bus 110, the processor 120, the memory 130, or the like) which are used in performing operations or functions implemented by other programming modules, for example, the middleware 132, the API 133 or the application 134. Furthermore, the kernel 131 may provide an interface through which the middleware 132, the API 133, and the application 134 may access individual component elements of the electronic device 101 to control or manage them.

The middleware 132 may perform a relay function to allow the API 133 or the application 134 to communicate with the kernel 131 to exchange data. Further, in relation to requests for an operation received from the application 134, the middleware 132 may control (e.g., a scheduling or a load-balancing) the requests by using, for example, a method of determining a sequence for using system resources (e.g., the bus 110, the processor 120, the memory 130, or the like) of the electronic device 101 with respect to at least one application among the applications 134.

The API 133 is an interface by which the application 134 controls functions provided from the kernel 131 or the middleware 132, and may include, for example, at least one interface or function (for example, instructions) for a file control, a window control, an image processing, a text control, or the like.

According to various embodiments, the application 134 may include a voice call application, a video call application, SMS/MMS applications, an e-mail application, a calendar application, an alarm application, a health care application (e.g., an application for measuring a quantity of motion, a blood sugar, or the like), an environment information application (e.g., an application for providing information of an atmospheric pressure, a humidity, a temperature, or the like), etc. Additionally or alternatively, the application 134 may be an application related to the exchange of information between the electronic device 101 and external electronic devices (for example, an electronic device 104). The application related to the information exchange may include, for example, a notification relay application for transferring particular information to the external electronic device or a device management application for managing the external electronic device.

For example, the notification relay application may include a function of transmitting notification information generated by another application (for example, the SMS/MMS application, the email application, the health care application or the environment information application) of the electronic device 101 to the external electronic device (for example, the electronic device 104). Additionally or alternatively, the notification relay application may receive notification information from, for example, an external electronic device (for example, the electronic device 104), and provide the same to a user. The device management application, for example, may manage (for example, install, delete, or update) at least some functions (for example, turning external electronic device (or some elements) on or off or adjusting the brightness (or resolution) of a display) of an external electronic device (for example, the electronic device 104) that communicates with the electronic device 101, applications performed in the external electronic device, or services (for example, a phone call service, or a messaging service) provided from the external electronic device.

According to the various embodiments, the application 134 may include an application designated according to a property (e.g., a kind of the electronic device) of the external electronic device (e.g., the electronic device 104). For example, in a case where the external electronic device is an MP3 player, the application 134 may include an application related to the reproduction of music. Similarly, when the external electronic device is a mobile medical device, the application 134 may include an application related to the health care. According to an embodiment, the application 134 may include at least one of an application designated to the electronic device 101 and an application received from an external electronic device (for example, a server 106 or the electronic device 104).

The input/output interface 140 may transfer an instruction or data input from a user through a input/output device (e.g., a sensor, a keyboard, or a touch screen) to the processor 120, the memory 130, or the communication interface 160, through, for example, the bus 110. For example, the input/output interface 140 may provide, to the processor 120, data for a user's touch which is input through the touch screen. In addition, the input/output interface 140 may output the instruction or data received from the processor 120, the memory 130 or the communication interface 160 through, for example, the bus 110. The input/output interface 140 may output the instruction or data through the input/output device (e.g., a speaker or the display). For example, the input/output interface 140 may output voice data processed by the processor 120 to the user through the speaker.

The display 150 may display various pieces of information (for example, multimedia data or text data) to a user.

The communication interface 160 may connect communication between the electronic device 101 and the external device (for example, the electronic device 104 or the server 160). For example, the communication interface 160 may access a network 102 through a wireless or a wired communication to communicate with the external device. The wireless communication may include at least one of, for example, a Wireless Fidelity (Wi-Fi), a Bluetooth (BT), a Near Field Communication (NFC), a Global Positioning System (GPS) and a cellular communication (for example, an LTE, an LTE-A, a CDMA, a WCDMA, a UMTS, a WiBro, a GSM or the like). The wired communication may include at least one of, for example, a Universal Serial Bus (USB), a High Definition Multimedia Interface (HDMI), a Recommended Standard 232 (RS-232), and a Plain Old Telephone Service (POTS).

According to an embodiment, the network 102 may be a communication network. The communication network may include at least one of a computer network, Internet, Internet of things, and a telephone network. According to an embodiment, a protocol (for example, a transport layer protocol, a data link layer protocol, or a physical layer protocol) for the communication between the electronic device 101 and the external device may be supported by at least one of the application 134, the application programming interface 133, the middleware 132, the kernel 131, and the communication interface 160.

FIG. 1 illustrates that the electronic device 101 includes the communication interface 160 to communicate with the external electronic device 104, the server 106, or the like through the network 120. But, according to another embodiment of the present disclosure, the electronic device 101 may be implemented to operate independently in the electronic device 101 without an additional communication function.

Figure 2:
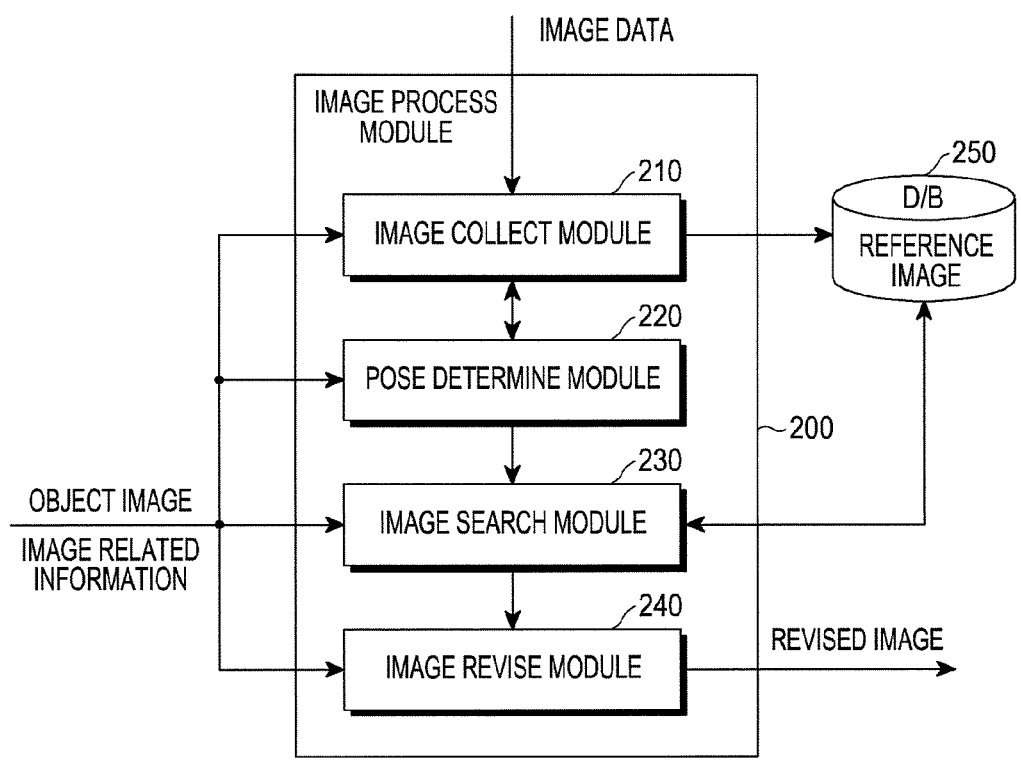
FIG. 2 illustrates an example of architecture of a software or a firmware which may be implemented in an electronic device according to an embodiment of the present disclosure.

FIG. 2 illustrates a configuration of an image process module according to an embodiment. In an embodiment, the image process module 200 may be implemented by using a software and/or a firmware. The software and/or the firmware may be stored in a memory (e.g., a non-volatile memory), and may be performed a processor. In another embodiment, the image process module 200 may be implemented by a combination of two or more of a software, a firmware and a hardware.

Referring to FIG. 2, the image process module 200 may include at least one of an image collect module 210, a pose determine module 220, an image search module 230 and an image revise module 240. In a shown embodiment, each of the modules 210, 220, 230 and 240 is separated. But, in another embodiment, two or more of the modules 210, 220, 230 and 240 may be combined, and may form one module. In addition, the image process module 200 may operate in connection with a reference image database 250.

The image collect module 210 may collect image data to store the image data to the reference image database 250, according to various embodiments of the present disclosure. The image collect module 210 may identify at least one object included in each image of the collected image data, and may determine a pose of the identified object. The image collect module 210 may store the collected image in the reference image database 250 together with information of the identified object or pose information of the object. In addition, according to another embodiment, the image collect module 210 may store the information of the object and the pose information of the object included in the collected image in the reference image database 250 by receiving the information of the object and the pose information of the object from an external device or another module in the electronic device.

According to various embodiment of the present disclosure, the image collect module 210 may determine whether the image collect module 210 stores the image collected as a reference image based on the determined pose information of the object. Detailed description with respect to this will be described in a description of FIGS. 4 and 5.

The image collect module 210 may collect the image data in various methods. For example, according to an embodiment of the present disclosure, the image collect module 210 may collect the image data stored in the electronic device. The image data stored in the electronic device may be image data photographed through a camera module of the electronic device, and may be image data transmitted from outside the electronic device by a wired or wireless communication means, for example, received at the electronic device from external device that photographed the image data. In addition, the image data stored in the electronic device may be grouped in an album type and stored. In addition, the image data may information matched with a specific number or a specific person stored in an address book (or a phonebook) of the electronic device. The image data collected in the image collect module 210 according to the various embodiment may be provided to the pose determine module 220.

The pose determine module 220 may determine the pose of the object included in the collected data. The determined pose information may include direction information of the object on a two-dimensional or three-dimensional plane. In addition, when the object is a face, the pose information may include information of an angle. Here, the angle is a ration angle in which the face is rotated from a front surface of the face in a left direction or a right direction. A method of determining the pose of the object in the pose determine module 220 may use various known image process methods. For example, a feature point detection (a FAST, an AGAST, a Hessian affine region detector and so on), a feature point descriptor (a SIFT, a SURF, a BRISK, a FREAK, and so on), a feature point matching algorithm (a brute-force, KD-tree usage, a locality sensitive hashing and so on), an object pose calculation algorithm (an RANSAC, a PROSAC, a M-estimator and so on), and the like may be used. But, the method of determining the pose of the present disclosure is not limited to the above-mentioned methods.

According to various embodiments of the present disclosure, the image collect module 210 may store the pose information of the object determined from the pose determine module 220 in the reference image database 250 together with the collected image data. In addition, according to an embodiment, the reference image database 250 may store an image having a different pose with respect to the same object as the reference image. Thus, when an image having the same pose with respect to the same object is stored in the reference image database 250 in advance, only one image data may be stored in the reference image database 250. Detailed embodiments with respect to this will be described in the description in FIG. 4 or FIG. 5.

When an object image for an image revising is provided to the image process module 200, the image search module 230 may search for the reference image including an object equal to an object included in the object image from the reference image database 250.

According to an embodiment of the present disclosure, when the object image is a video call image received from the other party during a video call, the object included in the object image may be a face of the other party of the call. In addition, when the video call image received in real time during the video call is provided as the object image, the object included in the object image may be determined as the face of the other party, and the image search module 230 may also search for the reference image matched with a name of the other party of the call in the reference image database 250.

For example, when the video call image received in real time during the video call is provided as the object image, information (e.g., a name, a telephone number, and the like) of the other party of the call may be information stored in the address book of the electronic device in advance. Thus, as described above, the image collect module 210 may match the information stored in the address book with the collected image data to store the matched information stored in the address book and the collected image data in the reference image database 250. The image search module 230 may easily search for the reference image including the object without identifying of the object included in the image during the video call.

In addition, when the object image for the image revising is provided to the image process module 200, the pose determine module 200 may determine the pose of the object included in the provided object image. A method of determining the pose of the object included in the object image in the pose determine module 220 may be implemented by various methods as described above. The pose information of the object determined in the pose determine module 220 may be provided to the image search module 230.

The image search module 230 may search the reference image corresponding to the determined pose information among at least one reference images including the object and stored in the reference image database 250, by using the pose information determined by the pose determine module 220. For example, when the object included in the provided object image is a face, and a direction of the face is front, the reference image wherein a direction of a face is a front may be searched for among the reference images including a person's face equal to the face included in the object image. The pose information of the object included in the object image may not be accurately equal to the pose information of the object included in the reference image, and a reference image having a pose most similar to the pose of the object included in the object image may be selected among the reference images including the object equal to the object included in the object image.

In addition, according to various embodiments of the present disclosure, the pose information may be divided into N number of poses set in advance. For example, when the object included in the image is the person's face, the pose of the face may be divided into a front surface, a 45 degrees in a left side direction, a 45 degrees in a right side direction, a left side surface, a right side surface, and the like. Thus, when the object included in the object image to be revised is the face, the most similar pose among the set five poses may be determined as the pose information of the object. Therefore, among the reference images including the same face and stored in the reference image database 250, the reference image stored as the same pose information may be determined as the reference image to be used for the revising among the front surface, the 45 degrees in a left side direction, the 45 degrees in a right side direction, the left side surface, the right side surface.

The image revise module 240 may revise the object image by using the reference image searched for through the image search module 230. A method of revising the image may use various known image process techniques.

For example, the image revise module 240 may use a super resolution method as the method of revising the image. The super resolution method is a technique capable of revising a low-definition object image into a high-definition image by using a high-definition reference image. The super resolution method is a method estimating a value of a pixel by a probability and statistics among mathematic methods such as a Markov Random Function (MRF) model.

As an embodiment of the image revising technique, for example, when data information of 4*4 pixels is received, in a case wherein two or three pixel information is omitted among the 4×4 pixels due to a reason of a network, an area where the pixel information is empty may be searched for among the reference images, and the pixel value of the area where the pixel information is omitted may be stochastically inferred based on the pixel value of the corresponding area.

In various embodiments of the present disclosure, when the image revise module 240 revises the object module, the image revise module 240 revises the image by using the reference image including the object of which the pose is equal to the pose of the object included in the object image, and thus an effectiveness of the revising may be higher. Thus, for example, after storing the face images having various poses with respect to each person stored in the address book, a face image having a pose equal or similar to a pose of the other party of the call during the video call with a person of which the reference image is stored is rapidly searched for, the face image is provided as the reference image for the image revising, and thus a high-definition video call service may be provided in real time.

At least a portion of or all functions of the image process module 200 described above may be processed in connection with the processor 120 (or an application processor) of FIG. 1. Alternatively, at least the portion of or all functions of the image process module 120 may be included in the processor 120 (or the application processor) to be implemented. In addition, each of the functions of the image process module 200 may be stored in the memory 130 as an application 134, and when the application 134 stored in the memory 130 is performed by the processor 120, the functions according to the various embodiments of the present disclosure described above may be performed. For example, the processor 120 may perform each of the applications 134 (e.g., an video call application) stored in the memory 130, and improve an image quality of the image received from the image process module 200 to display a user through the display 150.

In FIG. 2, the image process module 200 is separated from the processor 120 (or the application processor), but at least a partial function unit of the image process module 200 may be included in the processor 120 (or the application processor), and all functions of the image process module 200 may be included in the processor 120 (or the application processor).

An electronic device according to one of various embodiments of the present disclosure may include: at least one processor; a display; a communication module; and a memory device. The memory device is performed by the processor, and the memory device may be configured to store instructions enabling the electronic device to perform receiving at least one first image from an external device through the communication module; determining whether the electronic device revises at least a part of the first image, based on at least a portion of a quality of the first image; changing the part by using at least a portion of a second image; and displaying a third image including the changed part.

The receiving the at least one first image from the external device may include receiving the first image by using at least one of a cellular communication module or a non-cellular communication module of the electronic device.

The receiving the at least one first image from the external device may include receiving the first image during a video call.

The determining whether the electronic device revises the at least one part of the first image may include determining whether the electronic device revises the at least one part of the first image, based on at least a portion of a quality of a signal received during the receiving.

The at least one part of the first image may include a person's face shape included in the first image.

The second image may include an image stored in a non-volatile memory included in the electronic device.

The second image may be related to a contact application of the electronic device.

The memory device may further store instructions for performing a capturing of the second image by using a camera of the electronic device.

The second image may be received by using the communication module of the electronic device.

The changing the part by using the at least one portion of the second image may include using one or more pixel value of the at least one portion of the second image with one or more pixel value of the at least one part of the first image.

An electronic device according to one of various embodiments of the present disclosure may include: a pose determine module that determines a pose of an object included in an object image to be revised; an image search module that determines a reference image to be used in the revising among at least reference images including the object based on pose information of the object determined in the pose determine module; and an image revise module that revises the object image by using the determined reference image.

The object may be a face image.

The image search module may select the reference image including the object of which the pose is similar to the pose of the object, included in the object image, within a set range, among the at least reference images including the object.

The electronic device may further include an image collect module that stores a plurality of images including an object of which poses are different with respect to the same object as the reference image.

The image collect module may match the reference image to at least one telephone number in a telephone number list stored in the electronic device, and store the reference image.

The image collect module may collect the reference image from a picture album stored in the electronic device.

The image collect module may collect the reference image from an external server through a communication module included in the electronic device.

The external server may include a server related to a social network service.

The image collect module may collect the reference image from an image received from the other party of a call during the video call.

The image collect module may determine the pose of the object included in the collected image. The image collect module may determine whether there is the reference image including the object of which the pose is similar to the determined pose, within the set range, among the pre-stored reference images. As a result of the determination, when there is no pre-stored reference image, the collected image may be stored as the reference image.

When there is the pre-stored reference image including the object of which the pose is similar to the determined pose within the set range, the image collect module may compare an information amount of the object included in the collected image with an information amount of the object included in the pre-stored reference image, and when the information amount of the object included in the collected image is more than the information amount of the object included in the pre-stored reference image, the image collect module may replace the pre-stored reference image with the collected image to store the collected image.

The information amount of the object may be determined based on at least one of a resolution of the image including the object, a file size of the image including the object, a pixel number of an area where the object is included, and a size of the object.

The object image may be an image forming a frame of call image data received from the other party according to a start of the video call through the electronic device.

The image revise module may revise the object image by suing the reference image based on the super resolution method.

Hereinafter, a method of processing an image in an electronic device according to various embodiments of the present disclosure will be described with reference to FIGS. 3 and 4.

Figure 3:
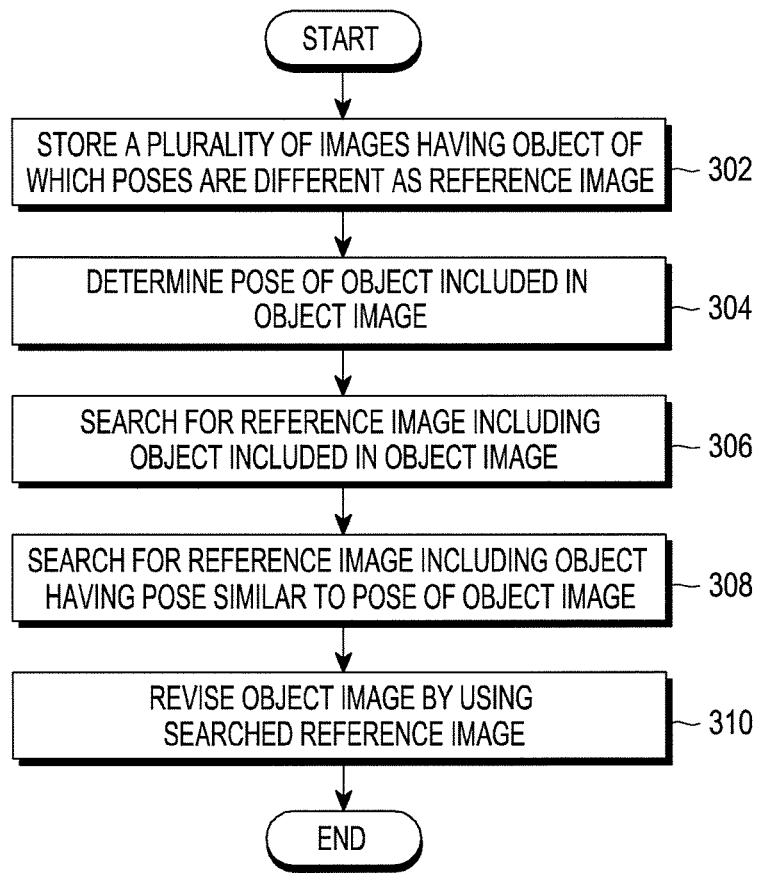
FIG. 3 is a flowchart illustrating an image process step in the electronic device according to an embodiment of the present disclosure.

FIG. 3 is a flowchart illustrating an image process step in the electronic device according to an embodiment of the present disclosure. Referring to FIG. 3, in step 302, a plurality of images including the objects of which the poses are different are stored as the reference image. For example, the pose of the object included in the images collected according to various embodiments of the present disclosure may be determined, and each of the images may be matched to the pose information of the object, and may be stored in the database. In addition, the plurality of reference images having the different poses with respect to the same object may be stored according to various embodiments of the present disclosure. In addition, the image having the larger information amount related to the object may be selected to be stored as the reference data among the images having the equal or similar poses within a set error range with respect to the same object, in the image data collected according to various embodiments of the present disclosure.

In step 304, when the object image for the image revising is received, the pose of the object included in the object image may be determined. For example, in the electronic device, the image transmitted from the other party of the call may be received as the object image in real time during the video call.

In step 306, the reference image including the object equal to the object included in the object image may be searched for. In step 308, among the reference images including the same object, the reference image including the object of which the pose is equal to the pose of the object image or similar to the pose of the object image within the set error range may be searched for or determined.

In step 310, the object image may be revised by using the searched reference image.

Figure 4:
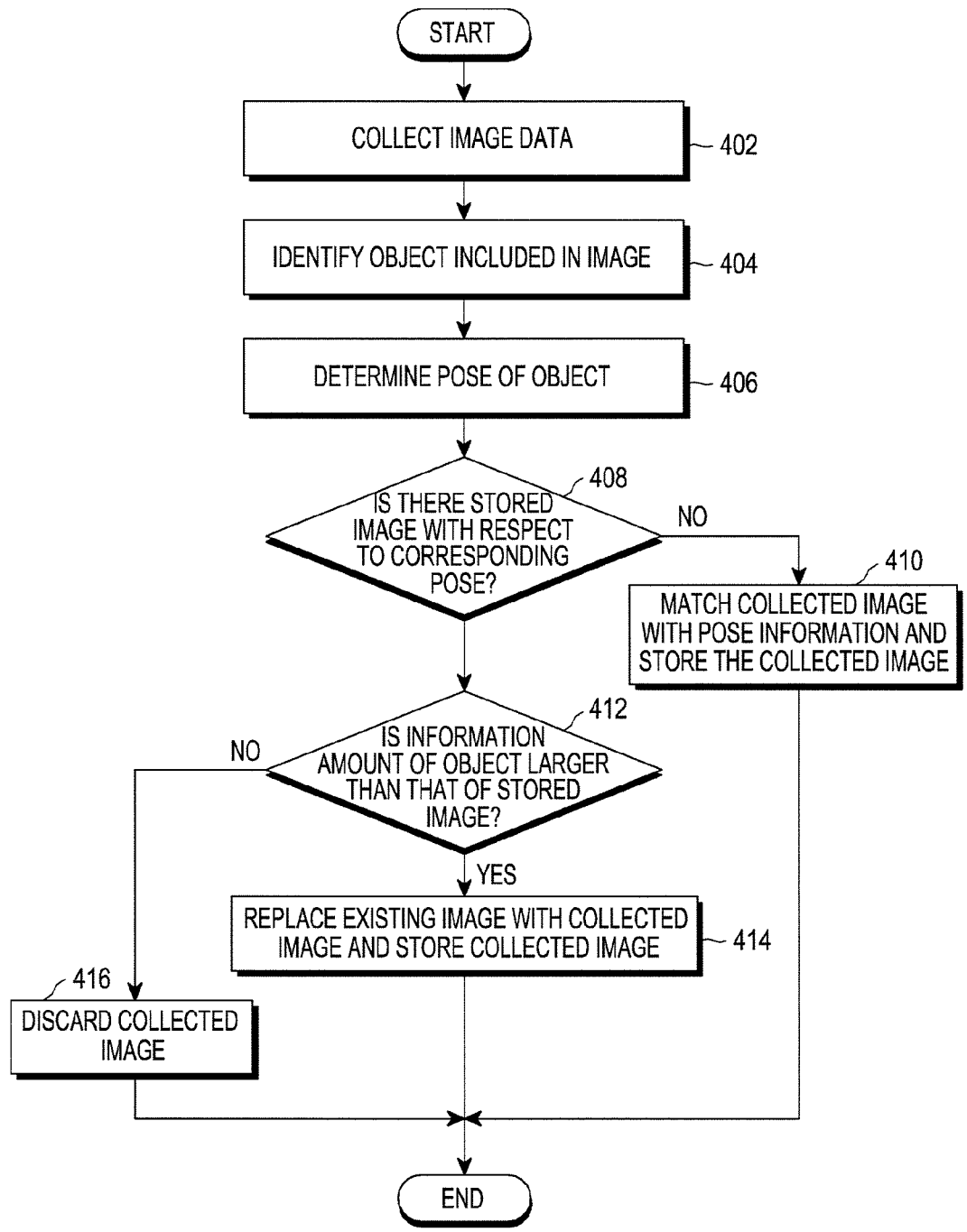
FIG. 4 is a flowchart illustrating a process of forming a reference image according to an embodiment of the present disclosure.

FIG. 4 is a flowchart illustrating a process of forming the reference image according to an embodiment of the present disclosure. Referring to FIG. 4, in step 402, the image data may be collected. The method of collecting the image data may be implemented in various methods as described above. For example, according to an embodiment of the present disclosure, the image data stored in the electronic device may be collected, and the image data transmitted from outside the electronic device by the wired or wireless communication means may be collected.

In step 404, the object included in the collected image may be identified. When person's information is matched to the collected image, and the image includes the person's face, the operation of identifying the object may be omitted. For example, according to various embodiments of the present disclosure, when the image stored in the phonebook is collected, the image is collected from a social network address of the specific person, or the information of the specific person is stored as meta information and the like of the collected image, the operation of identifying the object may be omitted.

In step 406, the pose of the object included in the image may be determined. The pose information may include direction information of the object on the two-dimensional or three-dimensional plane as described above. In addition, when the object is the face, the pose information of the object may include the information of the angle. Here, the angle is the ration angle in which the face is rotated from the front surface of the face in the left direction or the right direction.

In step 408, the database in which the reference data are stored is searched, and when the image including the object of which the pose is equal to or similar to the pose of the object included in the collected image is not stored in the database, in step 410, the collected image may be matched to the determined pose information and may be stored as the reference image.

In step 408, the database in which the reference data are stored is searched, and when the image including the object of which the pose is equal to or similar to the pose of the object included in the collected image is stored as the reference image in advance, in step 412, the information amount of the object in the image may be compared with the information amount of the object in the stored reference image. The information amount of the object may be determined based on at least one of the resolution of the image including the object, the file size of the image including the object, the pixel number of the area where the object is included, and the size of the object.

In step 412, when the information amount of the object included in the collected image is more than the information amount of the object included in the pre-stored reference image, in step 414, the pre-stored reference image may be replaced with the collected image as the reference image and the collected image may be stored. In contrast, in step 412, when the information amount of the object included in the collected image is not more than the information amount of the object included in the pre-stored reference image, in step 416, the collected image may be discarded.

In addition, according to another embodiment, in step 408, the database in which the reference data are stored is searched, and when the image including the object of which the pose is equal to or similar to the pose of the object included in the collected image is stored as the reference image in advance, the collected image may be discarded without the determination of the above-mentioned information amount of the object.

According to various embodiments of the present disclosure, at least one step (may be referred to an operation) among the steps shown in FIG. 3 or FIG. 4 may be omitted, and at least one another step may be added between the steps. In addition, the steps shown in FIG. 3 or FIG. 4 may be performed in the shown sequence. Alternatively, a performance sequence of at least one step may be exchanged with another performance sequence.

A method of operating an electronic device according to various embodiments of the present disclosure may include: receiving at least one first image from an external device, by the electronic device; determining whether the electronic device revises at least a part of the first image, based on at least a portion of a quality of the first image, by the electronic device; changing the part by using at least a portion of a second image, by the electronic device; and displaying a third image including the changed part, by the electronic device.

The receiving the at least one first image from the external device may include receiving the first image by using at least one of a cellular communication module or a non-cellular communication module of the electronic device.

The receiving the at least one first image from the external device may include receiving the first image during a video call.

The determining whether the electronic device revises the at least the part of the first image may include determining whether the electronic device revises the at least one part of the first image, based on at least a portion of a quality of a signal received during the receiving.

The at least one part of the first image may include a person's face shape included in the first image.

The second image may include an image stored in a non-volatile memory included in the electronic device.

The second image may be related to a contact application of the electronic device.

The method may include capturing the second image by using a camera of the electronic device.

The method may include receiving the second image using a communication module of the electronic device.

The changing the part by using the at least one portion of the second image may include using one or more pixel value of the at least one portion of the second image with one or more pixel value of the at least one part of the first image.

A method of processing an image in an electronic device according to various embodiments of the present disclosure may include: determining a pose of an object included in an object image to be revised; determining a reference image to be used in the revising among at least reference images including the object based on the determined pose information of the object; and revising the object image by using the determined reference image.

The object may be a face image.

The determining the reference image to be used for the revising may include selecting the reference image including the object of which the pose is similar to the pose of the object, included in the object image, within a set range, among the at least reference images including the object.

The method may further include storing a plurality of images including an object of which poses are different with respect to the same object as the reference image.

The reference image may be matched to at least one telephone number among the telephone number list stored in the electronic device.

The reference image may be collected from a picture album stored in the electronic device.

The reference image may be collected from an external server through a communication module included in the electronic device.

The external server may include a server related to a social network service.

The reference image may be collected from an image received from the other part of a call during the video call.

The storing the plurality of images as the reference image may include: determining the pose of the object included in the collected image; determining whether there is the reference image including the object of which the pose is similar to the determined pose, within a set range, among pre-stored reference images; and storing the collected image as the reference image when there is no pre-stored reference image, as a result of the determination.

When there is the pre-stored reference image including the object of which the pose is similar to the determined pose within the set range, the method may include: comparing an information amount of the object included in the collected image with an information amount of the object included in the pre-stored reference image; and when the information amount of the object included in the collected image is larger than the information amount of the object included in the pre-stored reference image, replacing the pre-stored reference image with the collected image to store the collected image.

The information amount of the object may be determined based on at least one of a resolution of the image including the object, a file size of the image including the object, a pixel number of an area where the object is included, and a size of the object.

The object image may be an image forming a frame of call image data received from the other party according to a start of the video call through the electronic device.

The revising the object image by the reference image may be revising the object image by using a super resolution method.

Hereinafter, methods of storing the reference data according to various embodiments of the present disclosure will be described with reference to FIGS. 5 to 9.

Figure 5:
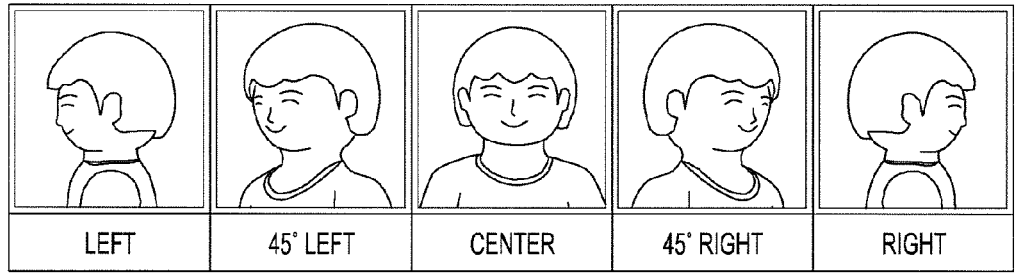
FIG. 5 illustrates the reference image of various poses with respect to the same object according to an embodiment of the present disclosure.

FIG. 5 illustrates the reference image of various poses with respect to the same object according to an embodiment of the present disclosure. Referring to FIG. 5, the reference images stored in the database according to an embodiment of the present disclosure may include a plurality of images in which poses are different with respect to the same object.

For example, as shown in FIG. 5, the reference image may be formed with the plurality of images in which the same object (e.g., the same person's face) is included, and the respective objects may have different poses with each other in the plurality of reference images including the same object. For example, when the object included in the reference image is the person's face, with respect to the same person's face, each of face images in which directions of the face are a central direction, 45 degrees in a left direction, 45 degrees in a right direction, a left side direction and a right side direction may be stored as the reference image. Thus, according to various embodiments of the present disclosure, the revising is performed with the reference image including the object of which the pose is the most similar to the pose of the object included in the object image to be revised, and thus an effectiveness of the revising may be higher.

In FIG. 5, five images including the person's face as the object are set as the reference images with respect to the same person, but according to various embodiments of the present disclosure, the number and/or the pose of the reference images with respect to the same person may be variously set. The number of the reference image may be set in advance as a proper number (e.g., five in FIG. 5) in order to maximally improve an effectiveness. In addition, according to an embodiment of the present disclosure, the reference images shown in FIG. 5 may be collected with respect to each person stored in the phonebook of the electronic device and may be stored. The phonebook may include a comprehensive meaning of personal information database having a telephone number as a key value.

A method of forming the plurality of reference images including the object of which the poses are different with respect to each person stored in the phonebook may be variously implemented. For example, the reference images may be formed by the method described in FIG. 4. Thus, when new image data is collected, the reference images shown in FIG. 5 may be replaced with the new image data having a more information amount according to each pose.

For example, a template formed with five slots with respect to the same person is generated as shown in FIG. 5, and it may be determined whether a slot corresponding to the pose of the object included in the collected image is empty. When the corresponding slot is empty, the collected image may be inserted into the corresponding slot.

When the reference image is stored in the corresponding slot in advance, it may be determined whether the reference image is replaced with the new image by comparing the information amount of the object included in the reference image stored in the corresponding slot in advance with the information amount of the object included in the collected image. For example, when a resolution of the collected image is higher than a resolution of the reference image stored in the corresponding slot of the template in advance, the pre-stored reference image may be replaced with the collected image. Thus, an image having the highest resolution among the images collected according to each slot may be stored as the reference image. In the above example, the information amount of the object is compared based on a resolution. But, as described above, the information amount of the object may be compared based on at least one of a file size of the image including the object, a number of a pixel where the object is included, a size of the object, in addition to the resolution of the image.

Hereinafter, methods of collecting the reference image according to various embodiments of the present disclosure will be described with reference to FIGS. 6 to 9.

Figure 6:
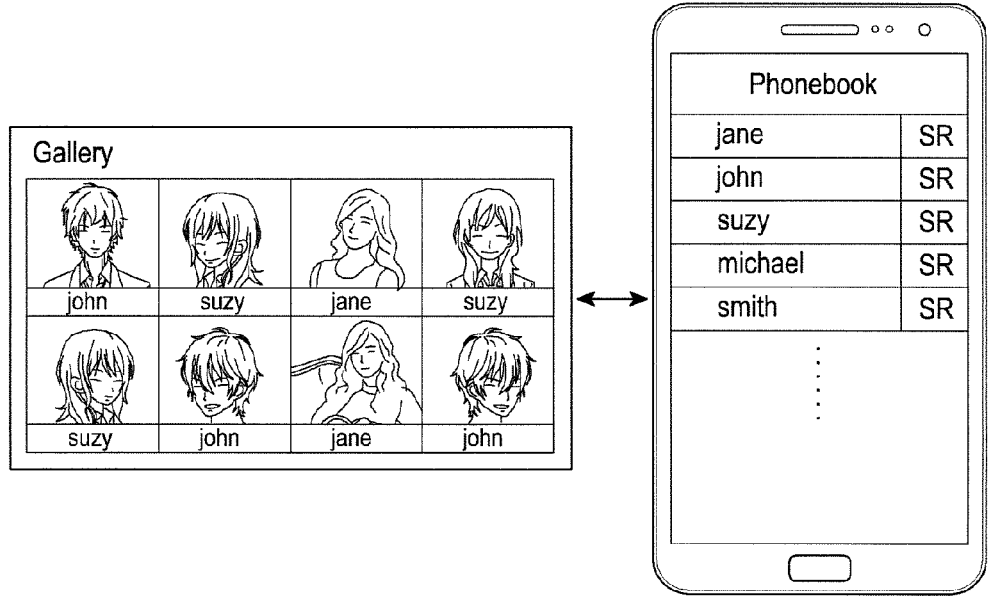
FIG. 6 illustrates a concept of a method of collecting the reference image through a gallery according to an embodiment of the present disclosure.

FIG. 6 illustrates a concept of the method of collecting the reference image through a gallery according to an embodiment of the present disclosure. Referring to FIG. 6, various images stored in an album or a picture gallery of the electronic device may be stored as the reference image in connection with the phonebook.

For example, in general, it is quite probable that a person to which the video call is made among people stored in the phonebook is a close friend, a lover or a family member, and it is quite probable that there is a picture photographed together with this person in one's own electronic device. Thus, a face recognition is performed with respect to each photographed picture, and thus a face image with respect to the people stored in the phonebook may be stored as the reference image.

For more specific example, as shown in FIG. 6, when a plurality of pictures with respect to a person, called John, are stored in the picture gallery, pose information of the face included in each picture is determined, the pose information and the corresponding picture are matched to the person, John, and the corresponding picture may be stored as the reference image. Thus, a plurality of images having different face poses with respect to each person registered in the phonebook may be stored as the reference images.

Figure 7:
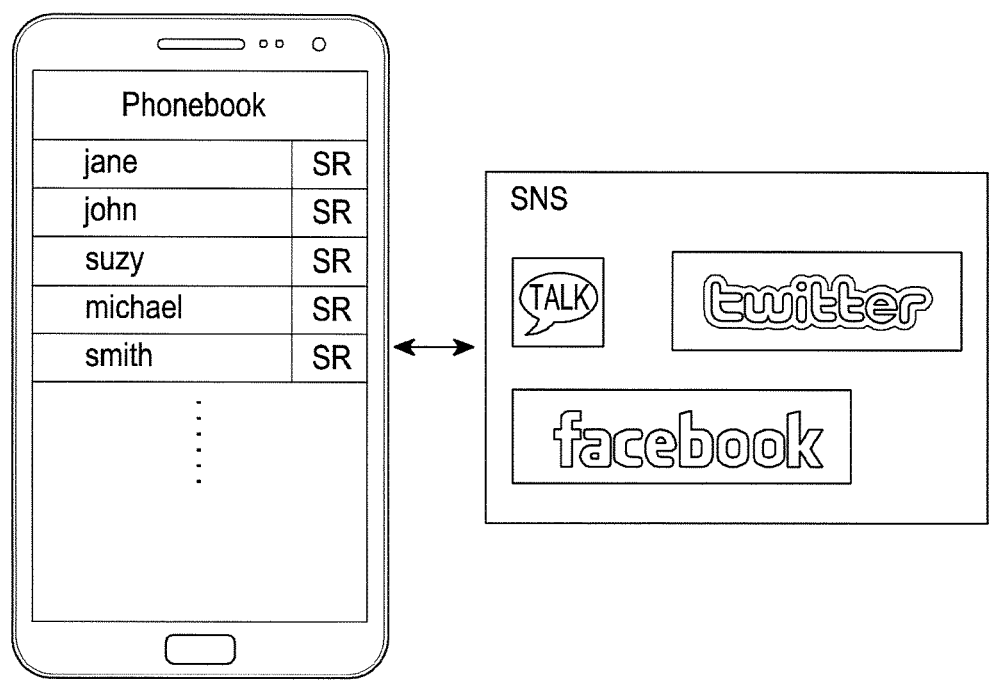
FIG. 7 illustrates a concept of a method of collecting the reference image through a social network service according to an embodiment of the present disclosure.

FIG. 7 illustrates a concept of the method of collecting the reference image through a social network service according to an embodiment of the present disclosure. Referring to FIG. 7, a picture image may be collected from various Social Network Services (SNS), and as illustrated in FIG. 6, the collected image may be stored as the reference images in connection with the phonebook.

More specifically, for example, in a case of an SNS connected with the phonebook, it is quite probable that there is a picture of a person stored in the phonebook in a server of the SNS. By using such a feature, the face image of the people stored in the phonebook from the SNS server may be collected and established as the reference image database. Thus, the face image with respect to each person registered in the phonebook may be collected from the SNS server and the plurality of images having the different face poses may be stored as the reference images.

Figure 8:
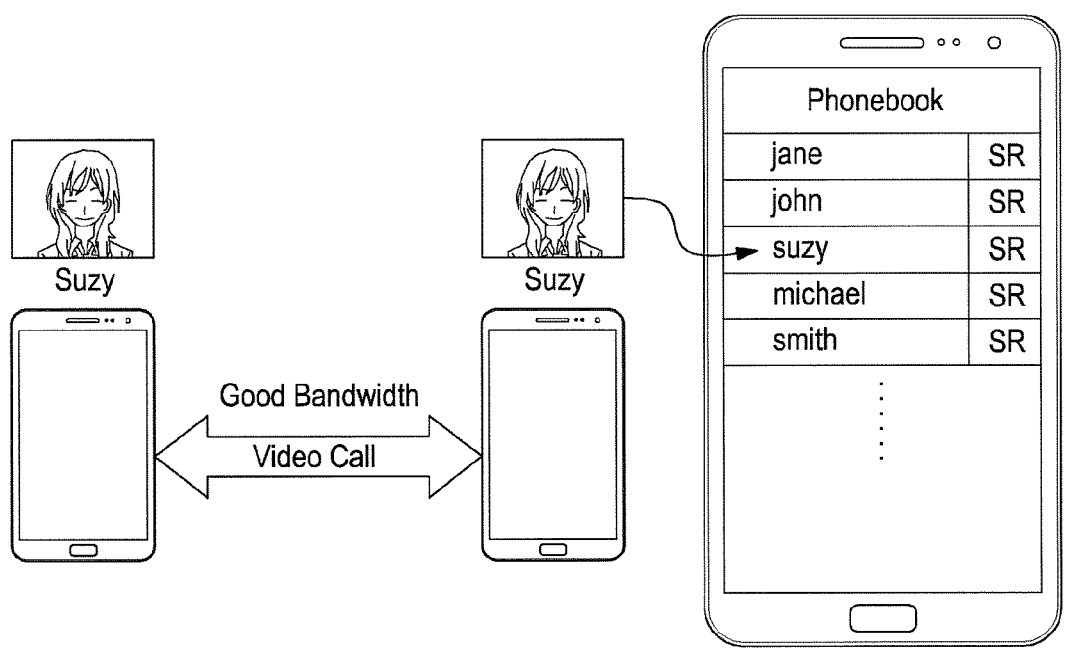
FIG. 8 illustrates a concept of a method of collecting the reference image through a video call according to an embodiment of the present disclosure.

FIG. 8 illustrates a concept of the method of collecting the reference image through the video call according to an embodiment of the present disclosure. Referring to FIG. 8, when a video call having a high-definition image (i.e., an HD image) is provided, the reference image database may be established by using a high-definition face image received at this time. Therefore, when a high-definition image may be not transmitted during the next video call because the electronic device is located in a weak electric field or a base station where many subscribers are crowded, a low-definition received image is revised into a pre-stored high-definition reference image, and thus a high quality video call service may be provided in a limited communication environment.

Figure 9:
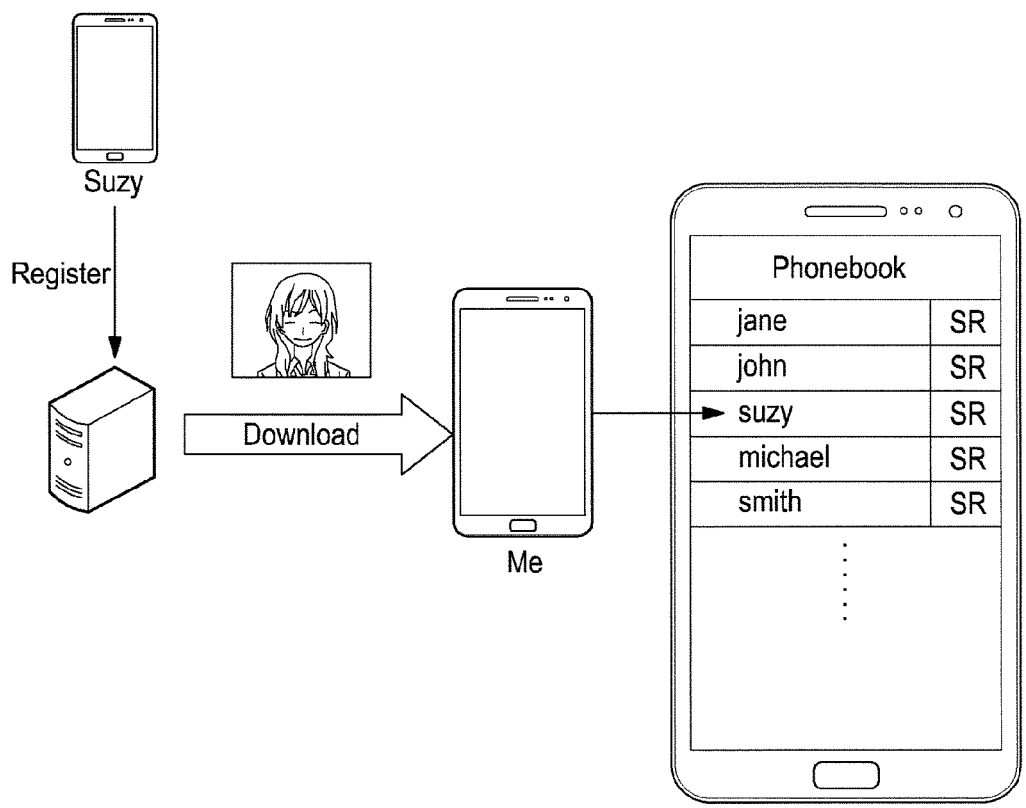
FIG. 9 illustrates a concept of a method of collecting the reference image through an external server according to an embodiment of the present disclosure.

FIG. 9 illustrates a concept of the method of collecting the reference image through an external server according to an embodiment of the present disclosure. Referring to FIG. 9, each user registers one's own high-definition face image in a server, and each user may enable other people related to the user to download the registered high-definition face image to use the downloaded face image as the reference image.

For example, the electronic device may request a search with respect to each user registered in the phonebook of the electronic device according to various embodiments of the present disclosure. According to the search request, when the high-definition image of the corresponding user is registered in a server, the registered high-definition image may be provided to the electronic device which requested the search. The provided high-definition face image may be stored as the reference image in connection with the corresponding person of the phonebook.

Figure 10:
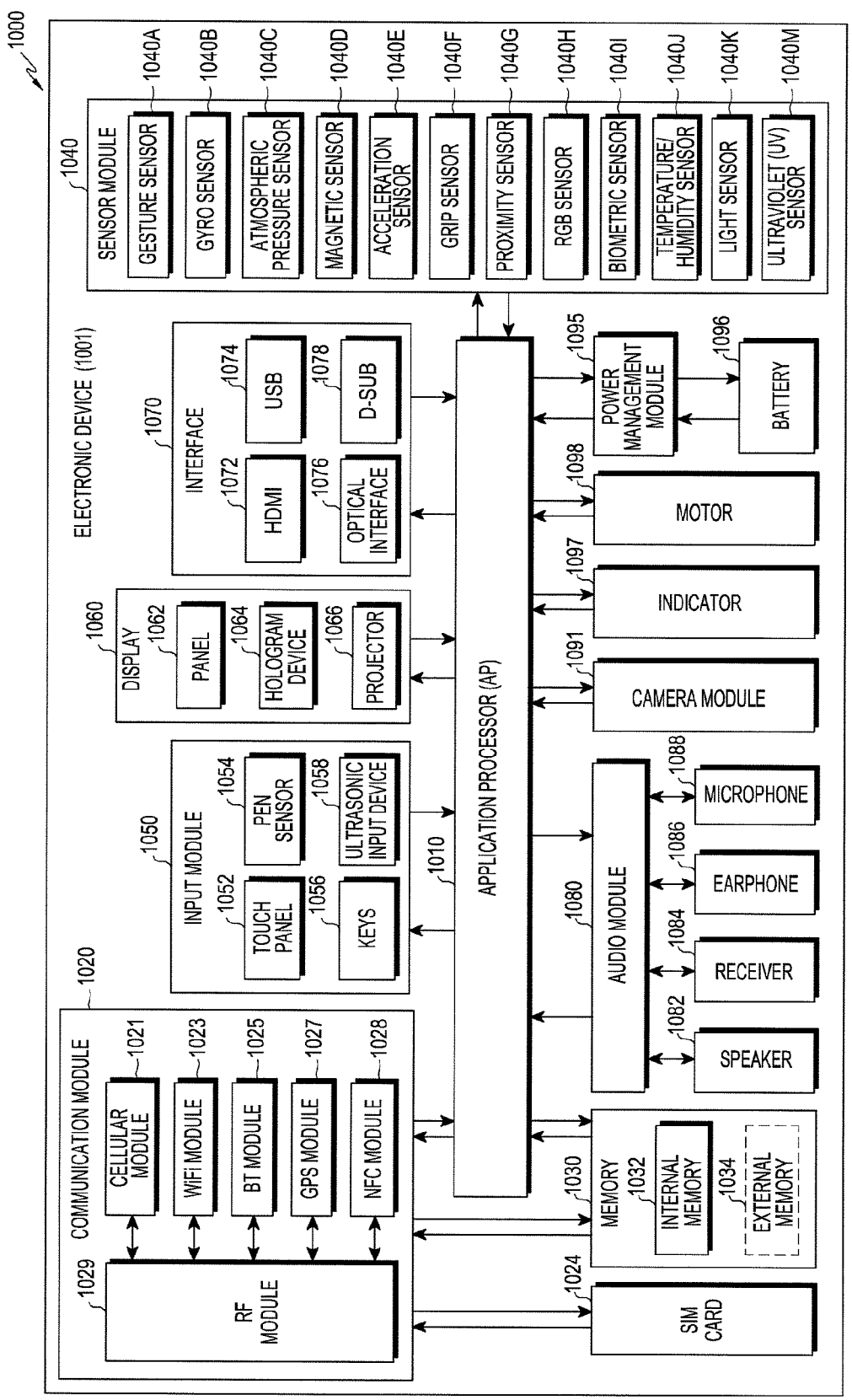
FIG. 10 is a block diagram illustrating a detailed structure of an electronic device according to an embodiment of the present disclosure.

FIG. 10 illustrates a block diagram 1000 of an electronic device 1001 according to various embodiments. The electronic device 1001 may constitute, for example, all or a part of the electronic device 101 shown in FIG. 1. Referring to FIG. 10, the electronic device 1001 may include at least one of an Application Processor (AP) 1010, a communication module 1020, a Subscriber Identifier Module (SIM) card 1024, a memory 1030, a sensor module 1040, an input device 1050, a display 1060, an interface 1070, an audio module 1080, a camera module 1091, a power management module 1095, a battery 1096, an indicator 1097, and a motor 1098.

The AP 1010 may control a plurality of hardware or software components connected to the AP 1010 by driving an operating system or an application program, process various data including multimedia data, and perform calculations. The AP 1010 may be implemented as, for example, a System on Chip (SoC). According to an embodiment, the AP 1010 may further include a graphic processing unit (GPU) (not shown).

The communication module 1020 (for example, the communication interface 160) may perform data transmission/reception in communication between the electronic device 1001 (for example, the electronic device 101) and other electronic devices (for example, the electronic device 104 and the server 106) connected over a network. According to an embodiment, the communication module 1020 may include a cellular module 1021, a WiFi module 1023, a BT module 1025, a GPS module 1027, an NFC module 1028, and a radio frequency (RF) module 1029.

The cellular module 1021 may provide a voice call, a video call, a message service, or an internet service through a communication network (for example, LTE, LTE-A, CDMA, WCDMA, UMTS, WiBro, GSM, or the like). Also, the cellular module 1021 may identify and authenticate an electronic device in a communication network using, for example, a subscriber identification module (for example, the SIM card 1024). According to an embodiment, the cellular module 1021 may perform at least a part of functions that may be provided by the AP 1010. For example, the cellular module 1021 may perform at least a part of a multimedia control function.

According to an embodiment, the cellular module 1021 may include a communication processor (CP). In addition, for example, the cellular module 1021 may be implemented as a System on Chip (SOC). In FIG. 10, the component elements such as the cellular module 1021 (e.g., a communication processor), the memory 1030, the power management module 1092, and the like are separated with the AP 1010, but, according to an embodiment, the AP 1010 may include at least a part of the above-mentioned component elements (e.g., the cellular module 1021).

According to an embodiment, the AP 1010 or the cellular module 1021 (e.g., the communication processor) may load a command or data received from at least one of a non-volatile memory and other elements connected thereto into a volatile memory and process the loaded command or data. Further, the AP 1010 or the cellular module 1021 may store data received from or generated by at least one of the other components in a non-volatile memory.

Each of the Wi-Fi module 1023, the BT module 1025, the GPS module 1027, and the NFC module 1028 may include, for example, a processor for processing data transmitted/received through the corresponding module. Although each of the cellular module 1021, the WiFi module 1023, the BT module 1025, the GPS module 1027, and the NFC module 1028 is shown as a separate block in FIG. 10, at least some (e.g., two or more) of the cellular module 1021, the WiFi module 1023, the BT module 1025, the GPS module 1027, and the NFC module 1028 may be included in one Integrated Chip (IC) or IC package according to an embodiment. For example, at least a few (for example, a communication processor corresponding to the cellular module 1021 and a Wi-Fi processor corresponding to the Wi-Fi module 1023) of the processors corresponding to the cellular module 1021, the Wi-Fi module 1023, the BT module 1025, the GPS module 1027, and the NFC module 1028, respectively, may be implemented as a single SoC.

The RF module 1029 may transmit/receive data, for example, an RF signal. Although not illustrated, the RF module 1029 may include, for example, a transceiver, a Power Amp Module (PAM), a frequency filter, a Low Noise Amplifier (LNA), or the like. Further, the RF unit 1029 may further include a component for transmitting/receiving an electromagnetic wave in the air in a radio communication, such as a conductor or a conducting wire. Although FIG. 10 shows that the cellular module 1021, the WiFi module 1023, the BT module 1025, the GPS module 1027, and the NFC module 1028 share one RF module 1029, at least one of the cellular module 1021, the WiFi module 1023, the BT module 1025, the GPS module 1027, and the NFC module 1028 may perform RF signal transmission/reception through a separate RF module.

The SIM card 1024 may be a card including a subscriber identification module, and may be inserted into a slot formed in a particular portion of the electronic device. The SIM card 1024 may include unique identification information (for example, Integrated Circuit Card IDentifier (ICCID)) or subscriber information (for example, International Mobile Subscriber Identity (IMSI)).

The memory 1030 (for example, the memory 130) may include an internal memory 1032 or an external memory 1034. The internal memory 1032 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, and the like).

According to one embodiment, the internal memory 1032 may be a Solid State Drive (SSD). The external memory 1034 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 1034 may be functionally connected to the electronic device 1001 through various interfaces. According to an embodiment, the electronic device 1001 may further include a storage device (or storage medium) such as a hard drive.

The sensor module 1040 may measure a physical quantity or detect an operation state of the electronic device 1001, and may convert the measured or detected information to an electronic signal. The sensor module 1040 may include, for example, at least one of a gesture sensor 1040A, a gyro sensor 1040B, an atmospheric pressure sensor 1040C, a magnetic sensor 1040D, an acceleration sensor 1040E, a grip sensor 1040F, a proximity sensor 1040G, a color sensor 1040H (e.g., a Red, Green, Blue (RGB) sensor), a biometric sensor 1040I, a temperature/humidity sensor 1040J, a light sensor 1040K, and a ultraviolet (UV) sensor 1040M. Additionally or alternatively, the sensor module 1040 may include, for example, a E-nose sensor (not illustrated), an ElectroMyoGraphy (EMG) sensor (not illustrated), an ElectroEncephaloGram (EEG) sensor (not illustrated), an ElectroCardioGram (ECG) sensor (not illustrated), an InfraRed (IR) sensor, an iris sensor (not illustrated), a fingerprint sensor, and the like. The sensor module 1040 may further include a control circuit for controlling one or more sensors included therein.

The input device 1050 may include a touch panel 1052, a (digital) pen sensor 1054, a key 1056, or an ultrasonic input device 1058. The touch panel 1052 may recognize a touch input through at least one of, for example, a capacitive type, a resistive type, an infrared type, and an acoustic wave type. The touch panel 1052 may further include a control circuit. The capacitive type touch panel may recognize physical contact or proximity. The touch panel 1052 may also further include a tactile layer. In this case, the touch panel 1052 may provide a tactile reaction to a user.

The (digital) pen sensor 1054 may be implemented, for example, using a method identical or similar to a method of receiving a touch input of a user, or using a separate recognition sheet. The key 1056 may include, for example, a physical button, an optical key or a keypad. The ultrasonic input device 1058 is a device which can detect an acoustic wave by a microphone (for example, a microphone 1088) of the electronic device 1001 through an input tool generating an ultrasonic signal to identify data, and can perform wireless recognition. According to an embodiment, the electronic device 1001 may also receive a user input from an external device (e.g., a computer or a server) connected thereto by using the communication module 1020.

The display 1060 (for example, the display 150) may include a panel 1062, a hologram device 1064, or a projector 1066. The panel 1062 may be, for example, a Liquid Crystal Display (LCD), Active-Matrix Organic Light Emitting Diode (AM-OLED), or the like. The panel 1062 may be implemented to be, for example, flexible, transparent, or wearable. The panel 1062 may be also configured as one module together with the touch panel 1052. The hologram device 1064 may show a stereoscopic image in the air by using interference of light. The projector 1066 may project light onto a screen to display an image. For example, the screen may be located inside or outside the electronic device 1001. According to an embodiment, the display 1060 may further include a control circuit for controlling the panel 1062, the hologram unit 1064, or the projector 1066.

The interface 1070 may include, for example, a High-Definition Multimedia Interface (HDMI) 1072, a Universal Serial Bus (USB) 1074, an optical interface 1076, or a D-subminiature (D-sub) 1078. The interface 1070 may be included in, for example, the communication interface 160 illustrated in FIG. 1. Additionally or alternatively, the interface 1070 may include, for example, a Mobile High-definition Link (MHL) interface, a Secure Digital (SD) card/Multi-Media Card (MMC) interface, or an Infrared Data Association (IrDA) standard interface.

The audio module 1080 may bilaterally convert a sound and an electronic signal. At least some components of the audio module 1080 may be included in, for example, the input/output interface 140 illustrated in FIG. 1. The audio module 1080 may process voice information input or output through, for example, a speaker 1082, a receiver 1084, earphones 1086, the microphone 1088, or the like.

The camera module 1091 is a device that can take still and moving images, and according to an embodiment, may include one or more image sensors (e.g., a front sensor or a rear sensor), a lens (not shown), an Image Signal Processor (ISP) (not shown), or a flash (e.g., an LED or a xenon lamp, not shown).

The power management module 1095 may manage power of the electronic device 1001. Although not illustrated, the power management module 1095 may include, for example, a Power Management Integrated Circuit (PMIC), a charger Integrated Circuit (IC), or a battery or fuel gauge.

The PMIC may be mounted to, for example, an integrated circuit or a SoC semiconductor. Charging methods may be classified into a wired charging method and a wireless charging method. The charger IC may charge a battery and prevent over voltage or over current from being flowed from a charger. According to an embodiment, the charger IC may include a charger IC for at least one of the wired charging and the wireless charging. A magnetic resonance scheme, a magnetic induction scheme, or an electromagnetic scheme may be exemplified as the wireless charging method, and an additional circuit for wireless charging, such as a coil loop circuit, a resonance circuit, a rectifier circuit, and the like may be added.

The battery gauge may measure, for example, a remaining quantity of the battery 1096, or a voltage, a current, or a temperature during the charging. The battery 1096 may store or generate electricity, and may supply power to the electronic device 1001 using the stored or generated electricity. The battery 1096 may include, for example, a rechargeable battery or a solar battery.

The indicator 1097 may display a particular state of the electronic device 1001 or a part thereof (for example, the AP 1010), for example, a boot-up state, a message state, a charging state, or the like. The motor 1098 may convert an electrical signal to a mechanical vibration. Although not shown, the electronic device 1001 may include a processing unit (e.g., a GPU) for supporting a mobile TV function. The processing unit for supporting the mobile TV may process, for example, media data according to a standard of a Digital Multimedia Broadcasting (DMB), a Digital Video Broadcasting (DVB), a media flow or the like.

Each of the components of the electronic device according to the present disclosure may be implemented by one or more components and the name of the corresponding component may vary depending on a type of the electronic device. The hardware 200 according to an embodiment of the present disclosure may include at least one of the above-described elements. Some of the above-described elements may be omitted from the hardware 200, or the hardware 200 may further include additional elements. Further, some of the components of the electronic device according to the present disclosure may be combined to be one entity, which can perform the same functions as those of the components before the combination.

The term "module" used in the present disclosure may refer to, for example, a unit including one or more combinations of hardware, software, and firmware. The "module" may be interchangeably used with a term, such as unit, logic, logical block, component, or circuit. The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. When the instructions are executed by one or more processors (e.g., the one or more processors 210), the one or more processors may perform functions corresponding to the instructions. The computer-readable storage medium may be, for example, the memory 220. At least some of the programming modules may be implemented (for example, executed) by, for example, the processor 210. At least a part of the programming module may include, for example, a module, a program, a routine, a set of instructions and/or a process for performing one or more functions.

The computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction (for example, programming module), such as a Read Only Memory (ROM), a Random Access Memory (RAM), a flash memory and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments, in a storage medium storing instructions, the instructions are set for enabling at least one processor to perform at least one operation when the instructions are performed by the at least one processor. The at least one operation may include: receiving at least one first image from an external device, by an electronic device; determining whether the electronic device revises at least a part of the first image, based on at least a portion of a quality of the first image, by the electronic device; changing the part by using at least a portion of a second image, by the electronic device; and displaying a third image including the changed part, by the electronic device.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of operating an electronic device, the method comprising:
   receiving, by the electronic device, at least one first image from an external device;
   determining, by the electronic device, whether to revise at least a part of the at least one first image based on at least a portion of a quality of the at least one first image;
   changing, by the electronic device, the part using at least a portion of a second image; and
   displaying, by the electronic device, a third image including the changed part,
   wherein the second image includes an image stored in a non-volatile memory included in the electronic device.

2. The method of claim 1, wherein the receiving the at least one first image from the outside includes receiving the at least one first image using at least one of a cellular communication module or a non-cellular communication module of the electronic device.

3. The method of claim 1, wherein the receiving the at least one first image from the external device includes receiving the at least one first image during a video call.

4. The method of claim 1, wherein the determining whether to revise the at least one part of the at least one first image includes determining whether the to revise the at least one part of the at least one first image based on at least a portion of a quality of a signal received during the receiving.

5. The method of claim 1, wherein the part of the at least one first image includes a person's face shape included in the at least one first image.

6. The method of claim 1, wherein the second image is related to a contact application of the electronic device.

7. The method of claim 1, further comprising:
capturing the second image using a camera of the electronic device.

8. The method of claim 1, further comprising:
receiving the second image using a communication module of the electronic device.

9. The method of claim 1, wherein the changing the part using the at least the portion of the second image includes using one or more pixel value of the at least the portion of the second image with one or more pixel value of the part of the at least one first image.

10. An electronic device comprising:
at least one processor;
a display;
a communication module; and
a memory configured to store instructions, that when executed by the at least one processor, cause the electronic device to:
   receive at least one first image from an external device through the communication module;
   determine whether to revise at least a part of the at least one first image based on at least a portion of a quality of the at least one first image;
   change the part using at least a portion of a second image; and
   display a third image including the changed part,
wherein the second image includes an image stored in a non-volatile memory included in the electronic device.

11. The electronic device of claim 10, wherein the electronic device is configured to receive the at least one first image by using at least one of a cellular communication module or a non-cellular communication module of the electronic device.

12. The electronic device of claim 10, wherein the electronic device is configured to receive the at least one first image during a video call.

13. The electronic device of claim 10, wherein the electronic device is configured to determine whether the to revise the at least one part of the at least one first image by determining whether the electronic device revises the at least one part of the at least one first image based on at least a portion of a quality of a signal received during the receiving.

14. The electronic device of claim 10, wherein the part of the at least one first image includes a person's face shape included in the at least one first image.

15. The electronic device of claim 10, wherein the second image is related to a contact application of the electronic device.

16. The electronic device of claim 10, wherein the electronic device is configured to perform a capturing of the second image by using a camera of the electronic device.

17. The electronic device of claim 10, wherein the second image is received through the communication module of the electronic device.

18. The electronic device of claim 10, wherein the electronic device is configured to change the part by using the at least one portion of the second image using one or more pixel value of the at least the portion of the second image with one or more pixel value of the part of the at least one first image.

* * * * *